United States Patent [19]

Bayer et al.

[11] Patent Number: 5,290,078
[45] Date of Patent: Mar. 1, 1994

[54] INTEGRAL FASTENERS FOR AN ENERGY ABSORBER OF A VEHICULAR BUMPER ASSEMBLY

[75] Inventors: Dean M. Bayer, Anderson; Timothy L. Gernand, Lapel; Virgil L. Woolman, Anderson, all of Ind.

[73] Assignee: General Motors Corporation, Detroit, Mich.

[21] Appl. No.: 891,072

[22] Filed: Jun. 1, 1992

[51] Int. Cl.⁵ .................................. B60R 11/22
[52] U.S. Cl. ........................ 293/120; 293/121; 293/155; 267/139
[58] Field of Search ............... 293/109, 110, 120, 121, 293/136, 155, 128, 142; 267/139, 140

[56] References Cited

U.S. PATENT DOCUMENTS

| | | | |
|---|---|---|---|
| 3,441,305 | 4/1969 | Trammell, Jr. | 293/128 |
| 3,843,475 | 10/1974 | Kent | 293/128 X |
| 3,866,963 | 2/1975 | Weller | 293/109 |
| 3,894,763 | 7/1975 | Barenyi | 293/1 |
| 4,066,285 | 1/1978 | Hall et al. | 293/120 |
| 4,193,621 | 3/1980 | Peichl | 293/142 |
| 4,275,912 | 6/1981 | Bayer | 293/120 |
| 4,325,574 | 4/1982 | Unemoto et al. | 293/120 |
| 4,386,799 | 7/1983 | Molnar | 293/120 |
| 4,466,646 | 8/1984 | Delmastro et al. | 293/117 |
| 4,474,395 | 10/1984 | Harloff et al. | 293/120 |
| 4,613,177 | 9/1986 | Loren et al. | 293/109 X |

FOREIGN PATENT DOCUMENTS

| | | | |
|---|---|---|---|
| 2702691 | 7/1978 | Fed. Rep. of Germany | 293/155 |
| 2943461 | 5/1981 | Fed. Rep. of Germany | 293/120 |
| 0156845 | 9/1984 | Japan | 293/121 |
| 2081653 | 2/1982 | United Kingdom | 293/121 |
| 2178703 | 2/1987 | United Kingdom | 293/109 |

*Primary Examiner*—Dennis H. Pedder
*Attorney, Agent, or Firm*—A. Michael Tucker

[57] ABSTRACT

An energy-absorbing bumper assembly includes an impact beam having a front vertical wall with a central inwardly projecting channel. A molded energy absorber formed as a multi-sectioned cellular unit includes mounting towers integrally formed with the unit. Resilient tabs on the mounting towers spring outwardly into complementary openings in the channel when the mounting towers are inserted into the channel, thereby removably attaching the energy absorber to the impact beam.

7 Claims, 2 Drawing Sheets

INTEGRAL FASTENERS FOR AN ENERGY ABSORBER OF A VEHICULAR BUMPER ASSEMBLY

BACKGROUND OF THE INVENTION

1. Field of the Invention

The present invention relates to vehicular energy-absorbing bumper assemblies, and in particular is concerned with an integrally formed attachment feature for an energy absorber.

2. Description of the Related Art

Many automotive bumper assemblies include an impact beam and an energy absorbing medium covered by a fascia. The energy absorbing medium can be formed as a multi-sectioned cellular unit molded from a suitable resilient material. An example of such an energy absorbing medium can be found in U.S. Pat. No. 4,275,912. The resilient cells of such media have been generally effective in absorbing low speed impact energy.

Prior to the present invention, an energy absorbing medium was secured to an impact beam with a variety of fasteners. This assembly technique adds to the bumper assembly cost by requiring additional labor and parts.

SUMMARY OF THE INVENTION

The present invention includes a vehicular bumper assembly and a method for assembling such a bumper assembly. The bumper assembly includes an energy absorber having integral mounting towers projecting from a rear surface. An impact beam has a complementary channel for receiving the mounting towers. If desired, a fascia can cover the energy absorber and the impact beam. The mounting towers function as integral fasteners, thereby eliminating the need for separately formed fasteners.

In a preferred embodiment, an energy-absorbing bumper assembly includes an impact beam having a front vertical wall with a central inwardly projecting channel. A molded energy absorber formed as a multi-sectioned cellular unit includes mounting towers integrally formed with the unit. Resilient tabs on the mounting towers spring outwardly into complementary openings in the channel when the mounting towers are inserted into the channel, thereby removably attaching the energy absorber to the impact beam.

DETAILED DESCRIPTION OF THE PREFERRED EMBODIMENT

Figure 1:
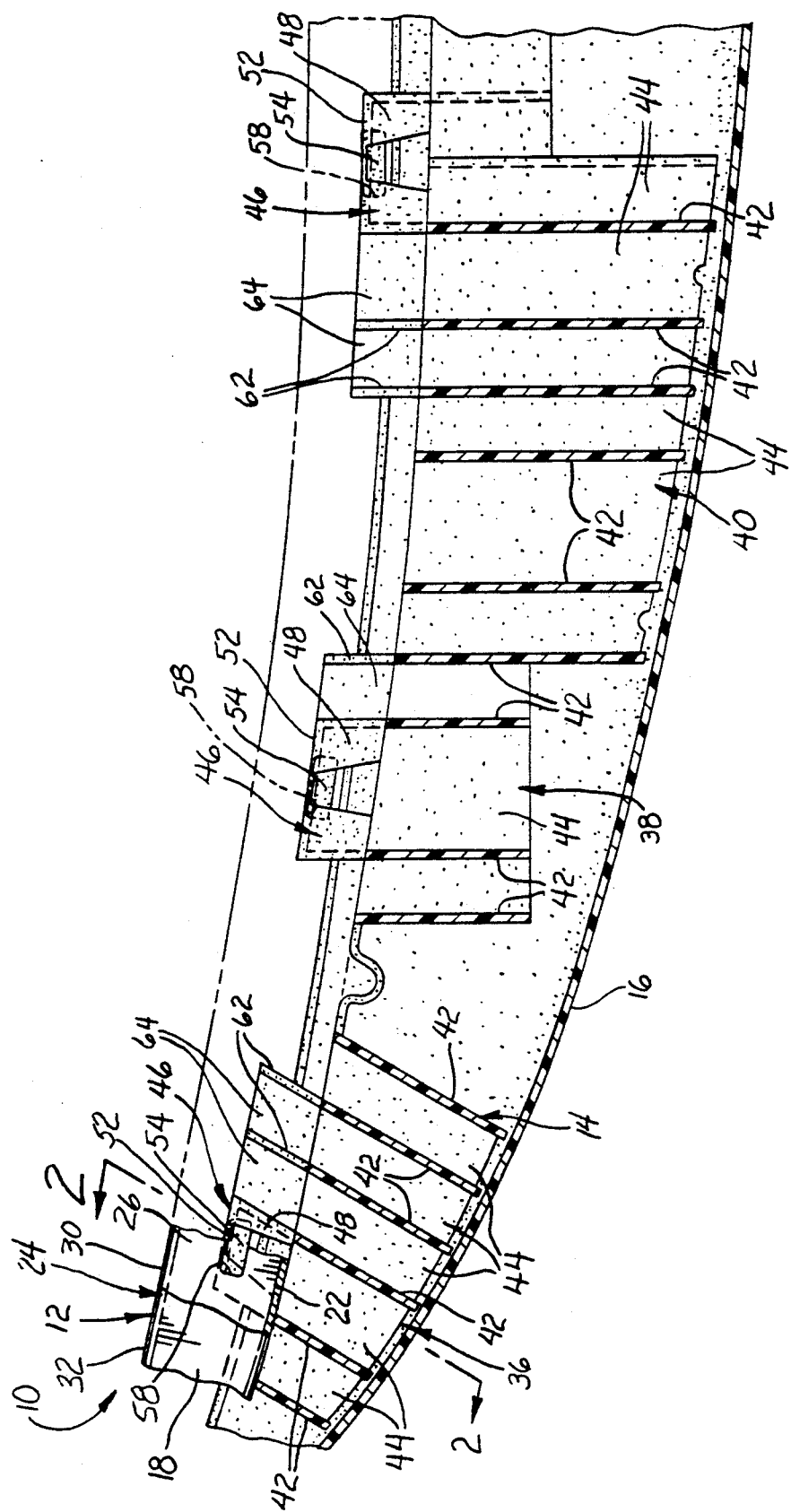
FIG. 1 is a top view of a bumper assembly according to the present invention illustrating a fascia covering an energy absorber attached to an impact beam.
Figure 2:
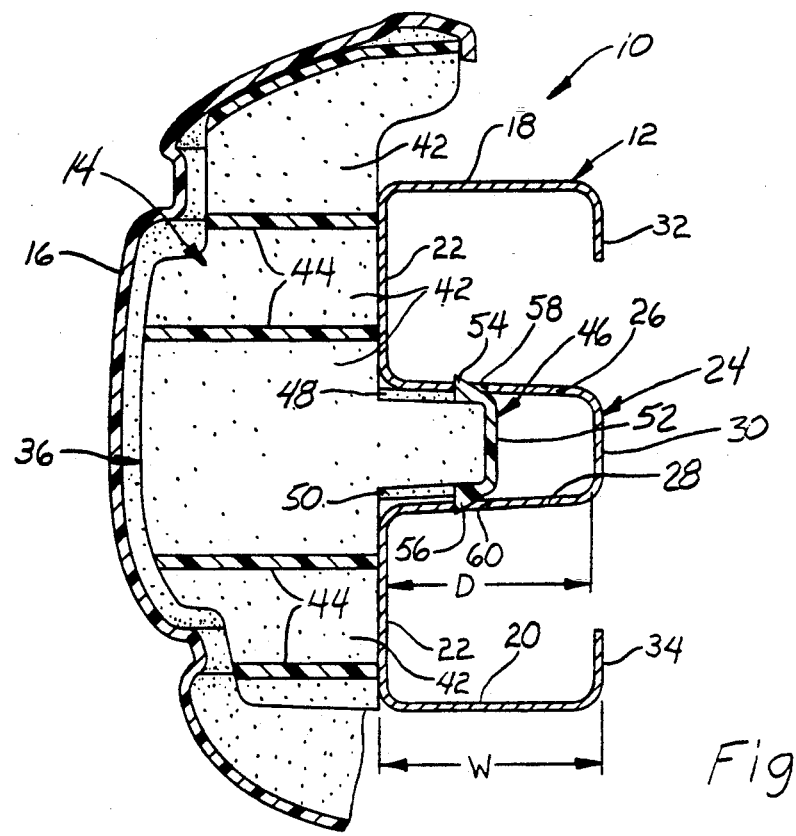
FIG. 2 is a sectional view taken along line 2—2 of FIG. 1 illustrating an integrally formed mounting tower of the energy absorber seated in a channel of the impact beam.
Figure 3:
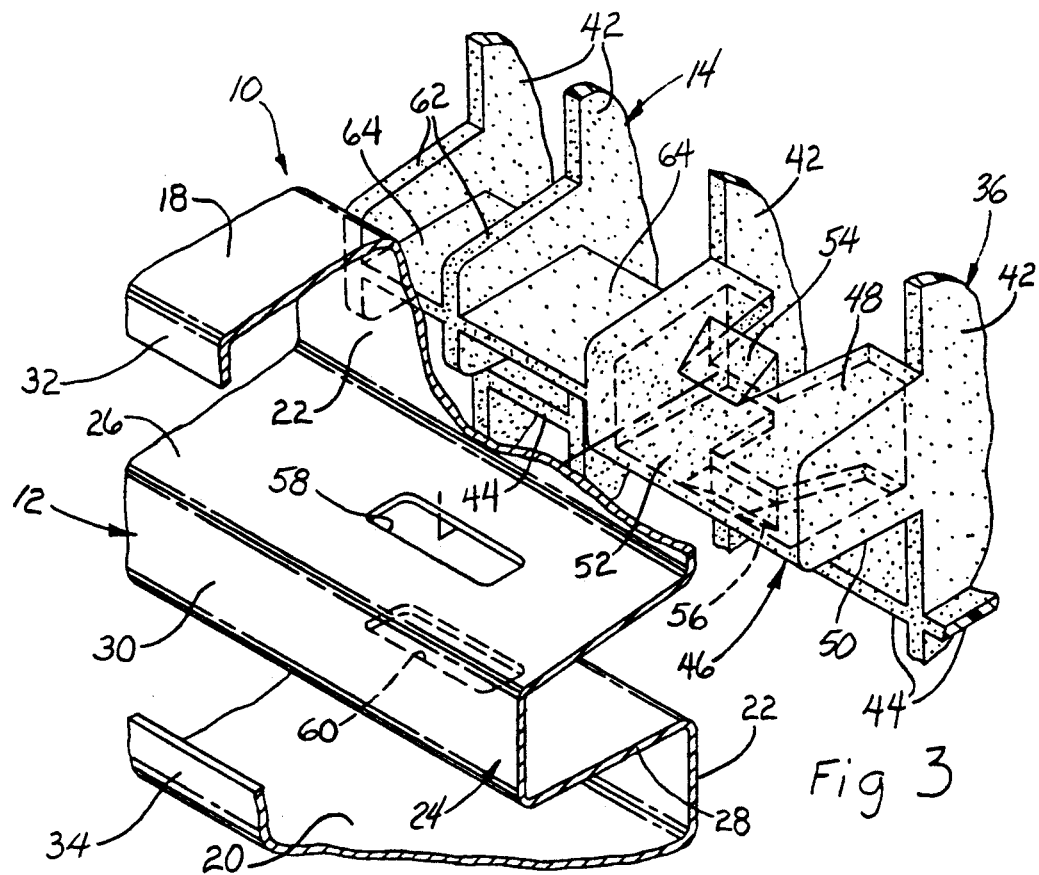
FIG. 3 is an exploded view of portions of the energy absorber and the impact beam of FIGS. 1 and 2.

A vehicular bumper assembly indicated generally at 10 is illustrated in FIGS. 1 and 2. The bumper assembly 10 includes an impact beam 12, an energy absorber 14 and a fascia 16.

The impact beam 12, formed from a suitable material capable of resisting deformation during collisions, includes first and second horizontal walls 18, 20 connected by a front vertical wall 22. A central channel 24 is formed in the vertical wall 22 by third and fourth substantially horizontal walls 26, 28 and a rear vertical wall 30. Preferably, the impact beam 12 is formed as an integral member and the depth D of the channel 24 is substantially equal to the width W of the impact beam 12. If desired, inwardly projecting vertical walls 32 and 34 can be provided on the first and second walls 18 and 20 as illustrated in FIG. 2.

The energy absorber 14 is a multi-sectioned cellular unit molded from a suitable resilient material such as modified polyethylene. The energy absorber 14 includes a plurality of sections such as 36, 38 and 40 wherein each section incorporates a latticework of intersecting vertical walls 42 (FIG. 1) and horizontal walls 44 (FIG. 2). The walls 42 and 44 form cells adapted to buckle along their lengths when impacted by loads to dissipate impact energy. After impact, the cells gradually recover to their preimpact conformation. The walls 42 and 44 terminate in rear surfaces which are placed against the front vertical wall 22 of the impact beam 12 when the energy absorber 14 is mounted.

A plurality of mounting towers 46 are integrally molded with the energy absorber 14 at the rear surfaces of the walls 42, 44. Each tower 46 includes first and second substantially horizontal walls 48 and 50 and a vertical wall 52. Preferably, the outline of a tower 46 is complementary to the cross section of the channel 24 so that a tower 46 is snugly received in the channel 24. Upper and lower resilient tabs 54, 56 are provided on the first and second horizontal surfaces 48, 50, respectively.

When the energy absorber 14 is assembled onto the impact beam 12, the towers 46 are inserted into the channel 24. Tabs 54, 56 are initially compressed by walls 26, 28 and then spring outwardly into complementary openings 58, 60 provided in the walls 26, 28. The outwardly-flexed tabs 54, 56 secure the energy absorber 14 to the impact beam 12 quickly and economically without the need for prior art fasteners. To remove the energy absorber 14 from the impact beam 12, the tabs 54, 56 are depressed as the towers 46 are pulled away from the channel 24. When the mounting towers 46 are inserted into the channel 24, the energy absorber 14 is restrained from motion during impacts to the bumper assembly 10.

In addition to the mounting towers 46, rearwardly projecting extensions 62 can be integrally molded with the energy absorber 14 at the rear surfaces of the walls 42, 44. Preferably, the outline of each extension 62 is complementary to the cross section of the channel 24. A horizontal connector 64 can be provided between the extensions 62 and to the mounting towers 46. When the energy absorber 14 is mounted, the extensions are received within the channel 24 and tend to support the energy absorber 14 on the impact beam 12.

The fascia 16 is formed and fitted over the energy absorber 14. The fascia 16 can be secured to the impact beam 12 or to vehicular body panels in any suitable manner.

Preferably, the mounting towers 46 have a relatively large cross section when compared to prior art fasteners. Such size and the insertion into the channel 24 enhance resistance to shear forces that can occur during an impact to the bumper assembly 10.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A vehicular bumper assembly comprising:
   (a) impact beam means having first and second horizontal walls joined by a front vertical wall, the vertical wall including an inwardly projecting channel having a depth substantially equal to a width of at least one of the first and second horizontal walls, the channel including at least one opening; and
   (b) energy absorber means having a latticework of intersecting vertical and horizontal walls forming a plurality of resilient cells adapted to buckle when impacted to dissipate energy and at least one mounting tower, integrally formed on the latticework, having a resilient tab received in the channel opening to removably attach the energy absorber means to the impact beam means.

2. The bumper assembly specified in claim 1 wherein an outline of the mounting tower is complementary to a cross section of the channel.

3. The bumper assembly specified in claim 1 wherein:
   (a) the channel is formed by first and second horizontal walls and a rear vertical wall, and the opening is provided in a horizontal wall; and
   (b) the mounting tower is formed by first and second horizontal walls and a vertical wall, and the tab is provided on a horizontal wall.

4. The bumper assembly specified in claim 1 including rearwardly projecting extensions integrally formed on the latticework adjacent the mounting tower.

5. The bumper assembly specified in claim 1 including a fascia fitted over the energy absorber means.

6. An automotive energy absorbing bumper assembly comprising:
   (a) an impact beam having first and second horizontal walls joined by a front vertical wall, and an inwardly projecting channel in the front vertical wall having a depth substantially equal to a width of at least one of the first and second horizontal walls, the channel formed by third and fourth horizontal walls and a rear vertical wall;
   (b) a plurality of openings in the third and fourth horizontal walls;
   (c) an energy absorber having a latticework of intersecting vertical and horizontal walls forming a plurality of resilient cells adapted to buckle when impacted to dissipate energy and a plurality of mounting towers, integrally formed on the latticework, projecting rearwardly and received in the channel; and
   (d) resilient tab means formed on the mounting towers complementary to and received in the openings of the third and fourth horizontal walls.

7. The bumper assembly specified in claim 6 including fascia fitted over the energy absorber.

* * * * *